May 7, 1968  H. L. ASHMEAD ET AL  3,381,519
GAS CHROMATOGRAPHIC BASELINE STABILIZER
Filed Dec. 28, 1964  2 Sheets-Sheet 1

INVENTORS
HOWARD L. ASHMEAD
PHILIP B. BELTZ
BY
Charles A. Weigel, Jr.
ATTORNEY

United States Patent Office 3,381,519
Patented May 7, 1968

3,381,519
GAS CHROMATOGRAPHIC BASELINE STABILIZER
Howard L. Ashmead, Newark, and Philip B. Beltz, Wilmington, Del., assignors, by mesne assignments, to Hewlett-Packard Company, Palo Alto, Calif., a corporation of California
Filed Dec. 28, 1964, Ser. No. 421,533
15 Claims. (Cl. 73—23.1)

ABSTRACT OF THE DISCLOSURE

A first electrical compensating signal having a known amplitude-time characteristic is algerbraically subtracted from the detector output signal in a chromatograph system. An error correcting means monitors the compensated signal and operates, whenever the compensated signal amplitude differs from zero, to return the compensated signal to a reference level. The error correcting means is disabled when the compensated signal exceeds a predetermined rate change or amplitude.

---

This invention relates to gas chromatography and, more particularly, to apparatus for compensating for the effects of system vagaries on a gas chromatograph detector. In one of its applications, the invention may be used to correct for "drift" of the reference level of the gas chromatograph detector's output signal.

A gas chromatograph is an analytical instrument that is used to separate in time and individually detect the several components of a sample to be analyzed. The gas chromatograph typically includes a separating column having a stationary phase, typically packed with a finely divided solid material upon which is dispersed a liquid having an affinity for the sample components. A carrier gas, or moving phase, passes continuously through the column. The sample to be analyzed is injected into the carrier gas stream where it is vaporized and swept or carried through the column. The sample constituents are swept through the column at different velocities, depending upon their volatilty and their affinity for the liquid stationary phase. In this manner the sample components are separated in time. A detector is employed to detect the several separated constituents and the detector output signal typically is plotted as a function of time to produce what is termed a chromatogram. As each sample component is eluted from the column it produces a sharp change in the detector output signal amplitude which appears as a peak or spike in the chromatogram.

Although every effort is made to control the system parameters such as temperature, pressure, flow rate, carrier gas purity, detector supply voltage, etc. vagaries exist and result in small extraneous and unwanted variations in the detector output signal amplitude. These variations, commonly referred to as baseline drift, produce corresponding variations in the time plot of the detector output signal, or chromatogram.

Column bleeding is particularly troublesome in producing unwanted variations in the detector output signal amplitude. As the column temperature increases, in programmed temperature operation, the column "bleeds," i.e., the vapor pressure of the column's liquid phase increases such that more of it is swept through the column to the detector. The detector responds to this bleeding of the liquid phase to produce an unwanted bleed signal. When the amplitude of the detector output signal is plotted vs. time (temperature), the bleed signal produces a rising response characteristic even in the absence of a sample component. This rising response renders analysis of the chromatogram more difficult to say the least. Even under constant temperature conditions, the normal vapor pressure of the column's liquid phase results in a small but unwanted bleed signal which contributes to baseline drift.

In an application of Levy et al. entitled "Detection Method and Apparatus for Gas Chromatograph" Ser. No. 299,426 filed Aug. 1, 1963, now Patent No. 3,257,847, and assigned to the assignee of this invention, a system and method of correcting for column bleeding was disclosed. The Levy et al. invention compensates for the unwanted detector response to column bleeding by generating a compensating electrical signal simulating the unwanted bleed signal and subtracting the compensating signal from the detector output signal. This technique has proven quite satisfactory but does not entirely compensate for the small but cumulative depletion of the separating column which has been found to occur due to repeated usage. Nor does it entirely compensate for the vagaries of other chromatograph system parameters that contribute to baseline drift.

Accordingly, it is an object of the present invention to compensate for extraneous variations in the amplitude of the detector output signal of a gas chromatograph.

Another object of the invention is to discriminate between wanted and unwanted variations in the amplitude of a gas chromatograph detector output signal.

An additional object of this invention is to provide an improved apparatus for compensating for the baseline drift of a gas chromatograph detector.

In accordance with this invention the unwanted responses of a gas chromatograph detector to vagaries of the various system parameters, including column bleeding, are reduced by a primary compensating electrical signal. The primary compensating signal which desirably simulates the column bleed characteristic, is algebraically subtracted from the detector output signal to provide a compensated signal substantially free of major system vagaries. Further in accordance with the invention, an error detecting or correcting means monitors the compensated signal. Whenever the compensated signal amplitude differs from zero, or some predetermined reference level, the error correcting means operates to return the compensated signal to the zero or reference level by varying the compensating signal amplitude. Upon the occurrence of sample component elution peaks the error corrector is disabled to permit observation and/or measurement of the peak area and height.

In a preferred embodiment of the invention the onset of a peak is sensed by a slope detector which observes the magnitude of the voltage applied to the servomotor of a potentiometric recorder. When this voltage, which is the related to the slope of the detector output signal, exceeds a predetermined magnitude the slope detector disables the error correcting means. To avoid false response of the slope detector to the elution peaks, additional means are provided for disabling the slope detector whenever an elution peak exceeds a predetermined value in height.

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 1 is a schematic represetation of a typical programmed temperature gas chromatograph;

FIGURE 2 includes plots illustrating chromatograph detector output signals representing a typical analysis, column bleed, and system vagaries along with a compensating signal 15, each plotted as a function of an independent variable time or temperature;

Figure 1:
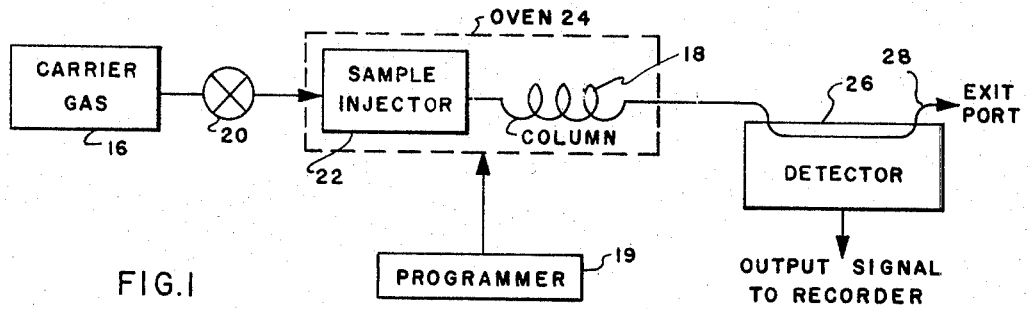

In FIG. 1 a source of carrier gas 16 is coupled through suitable tubing to a separating column 18. A control valve 20 may regulate the flow of the carrier gas through the column 18. Prior to passage through the column 18, the carrier gas is passed through a sample injector 22 for introducing a gaseous or liquid sample into the column. The column 18 and sample injector 22 may be enclosed in an oven 24 whose temperature may be varied or regulated in accordance with a predetermined program by a programmer 19. Any suitable programmer which is capable of varying the oven temperature as a function of time or other variable may be used.

From the sample injector 22, the carrier gas and sample, in gaseous or vapor state, pass through the column 18. The column is that part of the chromatograph which separates in time the sample components. Typically it comprises a tube filled with an inert solid support material on which is dispersed a liquid, often termed the "liquid phase." This combination of solid support and liquid phase constitutes the packing of a typical gas-liquid chromatograph column. The column length and packing are selected according to sample components to be separated.

A detector 26 is placed at the output of the column 18 to measure any changes in composition of the column effluent. Any suitable gas detector such as a hydrogen flame ionization detector may be used. From the detector 26, the carrier gas and sample components are vented to the atmosphere through an exit port 28. The detector provides an output electrical signal having an amplitude that varies in accordance with the sample components eluted from the column.

Figure 2:
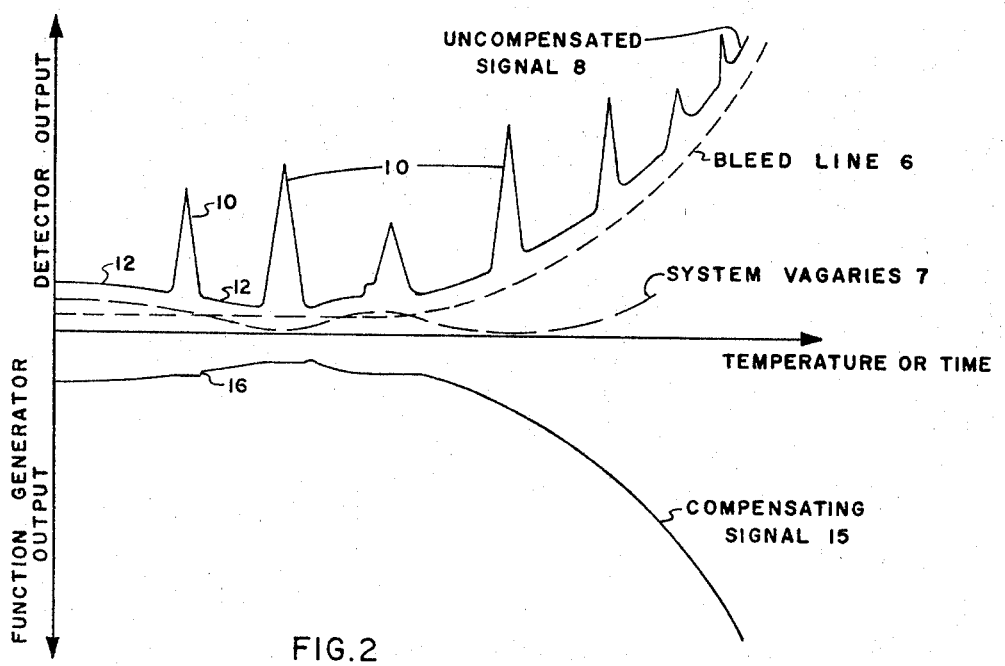
FIGURE 2A is an enlarged version of certain of the plots shown in FIG. 2 illustrating the characteristics of the uncompensated, compensating, and compensated signals in the immediate vicinity of the origin of FIG. 2.

Although the liquid phase is selected to have a low volatility, due to its finite vapor pressure it tends to volatilize or bleed, and be swept along with the volatile sample by the carrier gas out of the column. The bleed rate increases with column temperature and produces an unwanted output signal in the detector 26. Additionally, the other chromatographic system parameters such as column and detector temperature, carrier gas pressure and flow rate, the purity of the carrier gas, the flow rate of the sample components through the chromatograph and detector, and many other parameters are all subject to unwanted changes due to the vagaries of system operation, which are reflected in amplitude variations of the detector output signal. These variations are illustrated in the plot of FIG. 2 in which the uncompensated detector output signal 8 amplitude is plotted as a function of an independent variable such as time or column temperature. This plot is typically referred to as a chromatogram. The contribution to amplitude variations of the detector output signal caused by column bleed is illustrated by the dotted curve 6 and that caused by other system vagaries is illustrated by the dashed curve 7. As the column temperature increases, the column bleed paarmeter produces positive-going excursions that greatly exceed those produced by vagaries of the remaining system parameters.

In the uncompensated chromatogram of FIG. 2, the individual peaks 10 represent each of the components of the sample. As each of the sample components pass through the detector, the chromatogram peak returns to its reference level or baseline 12. Accurate analysis requires that the areas under each peak be determined. Unfortunately, the system vagaries render such analysis difficult because of the amplitude excursions caused by the system vagaries.

Figure 4:
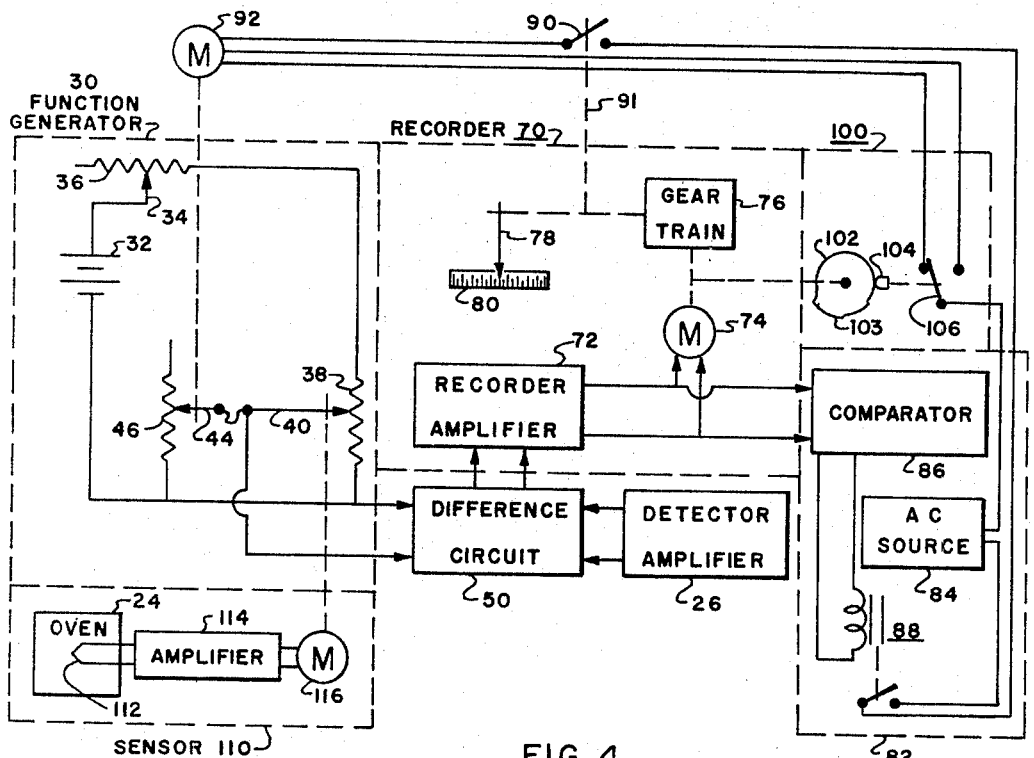
FIGURE 4 is a partial block and partial schematic diagram of a baseline compensating system constructed in accordance with a preferred embodiment of this invention.

These unwanted baseline excursions may be eliminated by the apparatus of the invention illustrated in FIG. 4. In this figure there is shown a function generator denoted by the dotted rectangle 30 for providing a compensating signal. The function generator 30 may comprise a source of DC potential illustrated by the battery 32. One terminal of the battery 32 is connected to the wiper 34 of zero adjusting potentiometer 36. One end of the resistance winding of the zero potentiometer 36 is connected through the resistance winding of the logarithmic potentiometer 38 to the negative terminal of the battery 32. The logarithmic potentiometer 38 includes a wiper 40 which is positioned along the potentiometer either as a function of time or temperature. The rate at which the wiper 40 is positioned and the electrical characteristics of the resistance winding of the potentiometer 38 preferably are selected so as to be capable of simulating the bleed-line characteristic of the chromatograph column as illustrated by curve 6 in FIG. 2. To correct for the unwanted excursions of the detector output signal due to vagaries other than column bleeding (curve 7) and to correct for the cumulative bleed depletion of the column that occurs with continued use, the wiper 40 is connected to the wiper 44 of a linear, vernier potentiometer 46. One end of the resistance winding of the vernier potentiometer 46 is also connected to the negative terminal of the battery 32. The wiper 44 is connected to be positioned by the reversible motor 92. The negative terminal in the battery 32 and the wipers 40 and 44 together provide a compensating signal 15 (FIG. 2) and are electrically connected to the input of a differential amplifier 50.

If the wiper 40 is to be positioned as a function of column temperature, a suitable sensor circuit such as that illustrated by the dotted rectangle 110 may be employed. In this instance the dotted rectangle 110 includes a thermocouple 112 positioned in the column oven 24 (FIG. 1). The thermocouple 112 is connected to a suitable amplifier 114 which compares the thermocouple signal to a reference signal in a known manner and its output is connected to drive a servomotor 116 for positioning the potentiometer wiper 40 of the function generator 30. In this manner the output function signal is generated strictly as a function of oven temperature (and hence to a close approximation of column temperature). Alternatively, if the oven temperature is programmed as a function of time the displacement of wiper 40 may likewise be programmed as a function of time.

The output of the function generator 30 is connected to one input of a difference circuit 50. The difference circuit 50 may comprise, for example, a pair of equal valued resistors connected to a common point. In this situation opposite polarity signals are connected to the two inputs which are then effectively subtracted. In the alternative, the difference circuit 50 may take the form of a differential amplifier which type circuits are well known in the art. In the event the detector 26 is a flame ionization type detector, requiring a high input impedance type electrometer amplifier, the algebraic addition may be accomplished in the feedback circuitry of the amplifier using well known techniques. Any suitable means for effecting the algebraic combination of the compensating and detector output signals may be employed as desired to meet the exigencies of the application.

The output of the detector (and its amplifier) 26 (FIG. 1) is connected to the remaining input of the differential amplifier 50. The output of the differential amplifier, which is the difference of its two input signals or the compensated output signal, is connected to a suitable indicating device such as a chart type recorder illustrated by the dotted rectangle 70. The recorder 70 includes a potentiometric amplifier 72 which converts the compensated detector output signals from the differential amplifier 50 into an AC signal for actuating a servomotor 74. The servomotor 74 operating through a conventional gear train 76 positions a pen 78 across an indicating chart denoted by the scale 80 and positions a slidewire to null balance the input signal. As is known in industrial recorders of this type which operate upon a potentiometric principle, the output of the recorder amplifier 72 is an alternating current signal whose phase and amplitude will vary in accordance with the direction and rate of pen movement. Thus in effect the output of the recorder amplifier 72 provides the first derivative with respect to the independent variable (time or temperature) of the compensated detector output signal.

A sensing circuit or slope detector denoted by the dotted rectangle 82 compares this first derivation signal to a reference voltage signal in a comparator 86. The comparator 86 may be of any suitable type. One type successfully employed rectifies or detects the varying amplitude A.C. signal from the amplifier 72 and compares the resulting D.C. signal with a D.C. reference voltage. When the amplitude of the first derivative signal from the recorder amplifier 72 exceeds that of the reference signal it denotes that a peak in the detector output signal is about to occur and an eluted component is passing through the detector of the gas chromatograph. The output of the comparator 86 is connected to open a relay switch 88 which opens a circuit from the A.C. source 84 through a microswitch 90 to the common terminal of the reversible motor 92 which positions wiper 44. This disables an error correcting circuit denoted by the dotted rectangle 100 during the occurrence of peaks in the detector output signal such that peak areas are not adversely affected as will be described.

The error correcting circuit 100 may comprise a suitable cam 102 coupled to the output of the servo positioning motor 74 in the recorder 70 and may be designed so as to actuate a cam follower 104 whenever the position of the pen 78 leaves zero or some other predetermined reference level or position. The servomotor 74 is used to drive the cam 102 directly, rather than through gear train 76 to obtain increased sensitivity. The gear train 76 typically makes only one revolution for every four of the motor 74. The cam follower 104 operates a two-position make-before-break switch 106 which selectively connects the remaining terminal of the A.C. source 84 to the respective forward and reverse windings of the motor 92. To lock the servomotor 92 in position, when vernier adjustments of the compensating signal are not required, the cam 102 is cut in accordance with known techniques to close the microswitch 106 on both contacts when the pen 78 is at its zero or reference position. The raised portion 103 of cam 102 causes the cam follower 104 to connect the A.C. source 84 to the reverse winding of motor 92. Hence, the error correcting circuit 100 is directionally sensitive. As the recorder pen 78 begins to move up scale, cam 102 acting through the switch 106 connects the A.C. source 84 to the forward winding of the motor 92 and conversely when the pen 78 is below zero, the cam 102 connects the A.C. source 84 to the reverse winding of the motor 92. This is necessary, as will be described, to adjust the nominal bleedline signal 6 by a sufficient amplitude to return the compensated detector output signal to its zero or reference level despite the vagaries of the system's parameters.

Finally, an additional sensing means or up scale detector includes a microswitch 90 which may be set to be actuated by movement of the pen 78 so as to open and thus disconnect the servomotor 92 if the displacement of pen 78 exceeds, say, 0.1 of its full scale movement. Upon the occurrence of a sharp or rapid deviation of the detector output signal from its baseline, the recorder amplifier 72 generates a signal having a large initial amplitude, but which immediately decreases to a lower amplitude once upscale travel of the pen 78 is initiated. Hence to continue the disablement of servomotor 92 for the duration of an elution peak, the microswitch 90 is used.

Figure 2A:
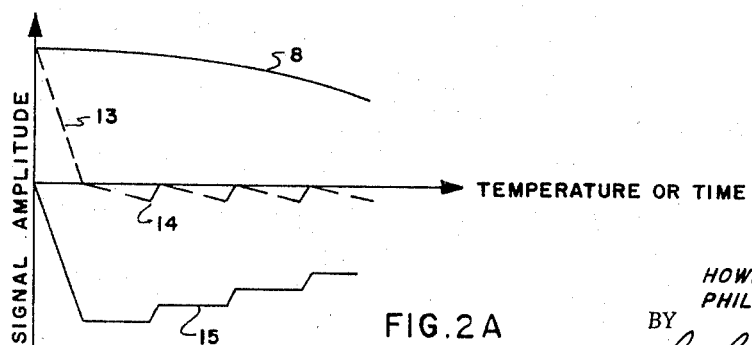
Figure 3:
FIGURE 3 is a plot of the detector output signal (detector output vs. temperature) of FIG. 2 which has been compensated in accordance with this invention for the effects of system vagaries including column bleeding.

In operation, the uncompensated detector output signal and the compensating signal from the function generator 30 are applied to the differential amplifier 50. The difference output, a compensated signal (FIG. 3) is applied to the recorder 70. The initial portions of compensated signal 13 as shown enlarged in FIG. 2A is amplified by the recorder potentiometric amplifier 72 and converted to an alternating current signal of varying phase and amplitude. The alternating current signal actuates the recorder motor 74 which positions pen 78. Initially the potentiometer wiper 34 may be manually adjusted to return the pen 78 to a predetermined position corresponding to the degree of compensation desired for the detector output signal. Correspondingly, the cam 102 is adjusted to be at its motor 92 locking position when this pen position exists. If the compensated signal 13 deviates or drifts from this predetermined amplitude level, say, zero, as denoted on the scale 80, this deviation is detected by the error correcting circuit 100.

Let us assume that after the preparatory adjustments described, initially the detector output signal 8 as shown in FIGS. 2, 2A has drifted in a positive-going direction due to some system vagary. Assume also that this signal is gradually decreasing in amplitude. This positive-going deviation of the uncompensated detector output signal 6 is sensed by the error correcting circuit 100. The positive-going deviation causes a partial rotation of the cam 102 as the servo amplifier attempts to displace pen 78 to a position on scale 80 corresponding to this positive deviation. Cam follower 104 moves the switch 106 to the upper terminal which causes the servomotor 92 to position the wiper 44 in such direction (downwardly in the drawing) to increase the negatively-going amplitude of the compensating signal 15. Compensating signal 15 is continuously increased in negative amplitude until the compensated signal 13 returns to zero (assuming that the cam 102 is so adjusted). Once the zero position is reached cam follower 104 closes switch 106 on both terminals so as to lock servomotor 92 in position. Vernier adjustment of the amplitude of the compensating signal ceases such that only the bleedline compensation continues to vary with time or temperature until the compensated signal again departs from its reference level.

With the passage of time, the uncompensated detector output signal 8 is illustrated as decreasing slightly in amplitude as denoted clearly in FIG. 2A. There is a corresponding amplitude change in the compensated signal 13 as denoted by the waveform 14. Once this negative-going drift has reached a sufficient amplitude (corresponding to the dead-band of the servo system) the error corrector circuit 100 senses the deviation via the cam 102 and the switch 106 is repositioned by the cam follower 104 to its upper position in the drawing so as to reverse servomotor 92 and decrease the amplitude of the compensating signal by again repositioning the wiper arm 44. This correction continues until the compensated signal 13 again returns to zero.

The amplitude of the compensating signal 15 is continuously modified in incremental steps so as to follow the minor deviations or drifts that occur as a function of time in the compensated detector output signal 13. The error corrector circuit 100 is directionally sensitive so as to afford the proper sense of correction to return the compensated signal 13 to its zero or reference level at all times. Upon the occurrence of the first elution peak 10 drift correction is terminated. With the peak signal, a large amplitude signal is generated by the recorder amplifier 72 which greatly exceeds that of the D.C. reference signal in comparator 86. Comparator 86 opens the relay switch 88 and de-energizes or disables servomotor 92. As the pen 78 moves upscale a predetermined amount, typically 2/10 of a scale deviation, an additional sensor in the form of microswitch 90 is actuated to maintain the servomotor 92 de-energized or disabled until such time as the elution peak terminates and the pen 78 again drops below the ²⁄₁₀ of a scale division displacement. Once the microswitch 90 is opened, it is immaterial whether or not the relay actuated switch 88 remains open or again closes as will occur when the elution peak 10 reaches its zenith and again decreases in amplitude.

As the eluted component passes through the detector and the resulting peak 10 on the chromatogram decreases in amplitude, the switch 90 is again closed. By this time the reverse slope of the peak 10 is flattening and the amplifier 72 output signal increased in amplitude sufficiently to open relay switch 88. The motor 92 remains disabled. With the cessation of an elution peak 10, the amplifier output drops in amplitude, relay switch 88 closes and the error correcting circuit 100 senses and corrects the amplitude of the compensating signal 15 for the interim drift 16 which occurred during the first elution peak 10. Corrective action continues in this manner and the compensating signal amplitude, which nominally may simulate the column bleed characteristic, is increased or decreased as necessary to reduce the effects of system vagaries on the detector output signal and thereby reduce baseline drift.

There has thus been described a relatively simple apparatus which uses the characteristics of a typical potentiometer amplifier to modify the amplitude of an electrical compensating signal to compensate for deviations which occur in the detector output signal of a gas chromatograph detector due to system vageries. Stated in another manner, the invention provides automatic compensation for the baseline drift inherent in most gas chromatographs.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. In a gas chromatograph system for analyzing the composition of a sample, said chromatograph having a separating column and a detector for providing an output electrical signal whose amplitude varies in accordance with the sample composition, apparatus for reducing unwanted amplitude variations in the output signal caused by first known and second unknown vagaries in the gas chromotograph system parameters, comprising in combination:

means for generating an electrical compensating signal having a predetermined amplitude-independent variable characteristic simulating the effect of said first vagary on said output signal, means for combining said compensating signal and said detector output signal in a sense to reduce the effect of said first vagary on said output signal, thereby to produce a partially compensated detector output signal, and error correcting means responsive to said compensated detector output signal differing from a predetermined value for varying the amplitude of said compensating signal in a sense to return the compensated detector output signal amplitude to said predetermined value, thereby to reduce the effect of said first and second vagaries on said output signal.

2. The apparatus set forth in claim 1 which also includes means responsive to the rate of change of amplitude of the compensated detector output signal exceeding a predetermined rate value for disabling said error correcting means, thereby to permit the occurrence of peaks in said compensated signal corresponding to said sample composition.

3. The apparatus set forth in claim 2 wherein said first system vagary is a result of column bleed which for a given column exhibits a reproducible amplitude-temperature characteristic.

4. The apparatus set forth in claim 2 wherein said error correcting means varies the amplitude of the compensating signal at a constant rate.

5. In a chromatograph system for analyzing the composition of a sample, said chromatograph having a separating column and a detector for providing an output electrical signal whose amplitude varies in accordance with the sample composition, apparatus for reducing unwanted amplitude variations in the output signal caused by first known and second unknown vagaries in the gas chromatograph system parameters, comprising in combination:

means for generating an electrical compensating signal having a predetermined amplitude-independent variable characteristic simulating the effect of said first vagary on said output signal, means for combining said compensating signal and said detector output signal in a sense to reduce the effect of said first vagary on said output signal, thereby to produce a partially compensated detector output signal, error correcting means responsive to said compensated detector output signal differing from a predetermined value for varying the amplitude of said compensating signal in a sense to return the compensated detector output signal amplitude to said predetermined value, thereby to reduce the effect of said first and second vagaries on said output signal, sensing means for sensing the rate of change of amplitude of the compensated detector output signal, means for generating a disabling signal when the rate of change of amplitude of the compensated signal exceeds a predetermined rate value, thereby to permit the occurrence of peaks in said compensated signal corresponding to said sample composition, and first means responsive to the disabling signal for disabling said error correcting means.

6. The apparatus set forth in claim 5 which also includes additional sensing means for determining when the amplitude of said compensated signal exceeds a second predetermined value, and second means responsive to said additional sensing means for disabling said error correcting means.

7. The apparatus set forth in claim 6 wherein said error correcting means varies the amplitude of the compensating signal at a constant rate.

8. The apparatus set forth in claim 7 wherein said electrical compensating signal has a predetermined amplitude-time characteristic.

9. In a gas chromatograph system for analyzing the composition of a sample, said chromatograph having a separating column and a detector for providing an output electrical signal whose amplitude varies in accordance with the sample composition, apparatus for reducing unwanted amplitude variations in the output signal, comprising in combination:

means for generating an electrical compensating signal, means for combinating said compensating signal and said detector output signal in opposition to compensate said detector output signal for said unwanted amplitude variations, error correcting means substantially continuously responsive to a difference between the compensated signal amplitude and a predetermined value for varying the amplitude of said compensating signal in a sense to reduce said difference, and means responsive to the rate of change of amplitude of the compensated detector output signal for disabling said error correcting means, thereby to permit the occurrence of peaks in said compensated signal corresponding to said sample composition.

10. In a gas chromatograph system for analyzing the composition of a sample, said chromatograph having a separating column and a detector for providing an output electrical signal whose amplitude varies in accordance with the sample composition, apparatus for reducing unwanted amplitude variations in the output signal, comprising in combination:

means for generating an electrical compensating signal, means for combining said compensating signal and said detector output signal in opposition to compensate said detector output signal for said unwanted amplitude variations, error correcting means substantially continuously responsive to a difference between the compensated signal amplitude and a predetermined value for varying the amplitude of said compensating signal at a known rate and in a sense to reduce said difference, sensing means responsive to the rate of change of amplitude of the compensated detector output signal for disabling said error correcting means thereby to permit the occurrence of peaks in said compensated signal corresponding to said sample composition, and additional sensing means responsive to the amplitude of said compensated output signal for disabling said error correcting means.

11. The apparatus set forth in claim 10 wherein said means for generating a compensating signal comprises:

a source of potential, a first potentiometer having a resistance element connected across said source and a wiper, said compensating signal being derived between one end of said element and said wiper, said resistance element having a logarithmic resistance-length characteristic, an electrical motor for positioning said wiper along said element at a constant rate, and a second potentiometer having a second resistance element and second wiper, one end of said second resistance element being connected to said first potentiometer resistance element.

12. The apparatus set forth in claim 11 wherein said error correcting means comprises:

a potentiometric recorder having a rebalancing slidewire, a chopper stabilized D.C. amplifier, a servomotor actuated by said amplifier to rebalance said slidewire, and means responsive to the sense of rotary displacement of the servomotor for repositioning the wiper of said second potentiometer thereby to vary the amplitude of said compensating signal in both senses.

13. The apparatus set forth in claim 12 wherein said means responsive to the sense of said rebalancing servomotor displacement comprises:

a cam having first, second and third actuating positions corresponding respectively to values of said compensated signal amplitude of less than, equal to, and more than said predetermined value, and cam follower means responsive to the movement of said cam for reversibly positioning said second potentiometer wiper.

14. The apparatus set forth in claim 13 wherein said sensing means comprises means responsive to the amplitude of the output signal from said potentiometric amplifier.

15. The apparatus set forth in claim 14 wherein said additional sensing means includes a wiper on said rebalancing slidewire and switch means responsive to the position of the rebalancing slidewire wiper for deactivating the positioning means for second potentiometer wiper.

References Cited

UNITED STATES PATENTS

| | | | |
|---|---|---|---|
| 3,247,703 | 4/1966 | Burk | 73—23.1 |
| 3,257,847 | 6/1966 | Levy et al. | 73—23.1 |
| 3,281,687 | 10/1966 | Boer et al. | 73—23.1 XR |
| 3,316,751 | 5/1967 | Burk | 73—23.1 |

RICHARD C. QUEISSER, *Primary Examiner.*

JAMES J. GILL, *Examiner.*

C. A. RUEHL, *Assistant Examiner.*